United States Patent
Nagata et al.

(10) Patent No.: US 9,080,491 B2
(45) Date of Patent: Jul. 14, 2015

(54) EXHAUST GAS PURIFYING CATALYST

(75) Inventors: Masato Nagata, Yokosuka (JP);
Masanori Nakamura, Yokosuka (JP);
Hironori Wakamatsu, Yokohama (JP);
Katsuo Suga, Yokohama (JP)

(73) Assignees: NISSAN MOTOR CO., LTD.,
Yokohama-shi (JP); RENAULT S.A.S. SOCIETE PAR ACTIONS SIMPLIFIEE, Boulogne Billancourt (FR)

( * ) Notice: Subject to any disclaimer, the term of this patent is extended or adjusted under 35 U.S.C. 154(b) by 0 days.

(21) Appl. No.: 12/312,286

(22) PCT Filed: Nov. 14, 2007

(86) PCT No.: PCT/JP2007/072071
§ 371 (c)(1),
(2), (4) Date: May 4, 2009

(87) PCT Pub. No.: WO2008/059858
PCT Pub. Date: May 22, 2008

(65) Prior Publication Data
US 2009/0318286 A1    Dec. 24, 2009

(30) Foreign Application Priority Data

Nov. 14, 2006 (JP) .................................. 2006-307674

(51) Int. Cl.
*B01J 23/46* (2006.01)
*B01J 23/38* (2006.01)
(Continued)

(52) U.S. Cl.
CPC ............ *F01N 3/2832* (2013.01); *B01D 53/944* (2013.01); *B01J 23/10* (2013.01); *B01J 23/40* (2013.01); *B01J 23/63* (2013.01); *B01J 35/008* (2013.01); *B01J 35/023* (2013.01); *B01J 37/0201* (2013.01); *B01J 37/0248* (2013.01); *B01D 2255/10* (2013.01); *B01D 2255/1021* (2013.01); *B01D 2255/1023* (2013.01); *B01D 2255/1025* (2013.01);
(Continued)

(58) Field of Classification Search
USPC .................................................. 502/339, 329
See application file for complete search history.

(56) References Cited

U.S. PATENT DOCUMENTS

2007/0155626 A1 * 7/2007 Yasuda et al. ................. 502/329
2007/0281856 A1   12/2007 Sasaki et al.

FOREIGN PATENT DOCUMENTS

| EP | 1669135 A1 | 6/2006 |
| EP | 1946834 A1 | 7/2008 |
| JP | 4-180835 A | 6/1992 |
| JP | 2003-117393 * | 4/2003 |
| JP | 2005-230616 * | 2/2005 |
| JP | 2005-236016 * | 2/2005 |
| JP | 2005-169203 A | 6/2005 |

(Continued)

OTHER PUBLICATIONS

European Summons to Attend Oral Proceedings, Aug. 18, 2014, 10 pages.

*Primary Examiner* — Melvin C Mayes
*Assistant Examiner* — Colette Nguyen
(74) *Attorney, Agent, or Firm* — Foley & Lardner LLP

(57) ABSTRACT

The present invention provides an exhaust gas purifying catalyst that can keep high catalytic performance even being subjected to exhaust gas. The exhaust gas purifying catalyst includes: noble metal particles (7); and supports (3), each support supporting the noble metal particles (7), wherein at least a certain amount of the noble metal particles (7) is provided on an outermost surface of the support (3), or provided within a range of 10% inside of a diameter of the support (3) from the outermost surface in a direction toward a center of the support.

8 Claims, 4 Drawing Sheets

(51) Int. Cl.
*F01N 3/28* (2006.01)
*B01D 53/94* (2006.01)
*B01J 23/10* (2006.01)
*B01J 23/40* (2006.01)
*B01J 23/63* (2006.01)
*B01J 35/00* (2006.01)
*B01J 35/02* (2006.01)
*B01J 37/02* (2006.01)

(52) U.S. Cl.
CPC .. *B01D 2255/206* (2013.01); *B01D 2255/2092* (2013.01); *B01D 2255/407* (2013.01); *B01D 2255/90* (2013.01); *B01D 2255/908* (2013.01); *B01D 2255/9202* (2013.01); *F01N 2330/08* (2013.01); *F01N 2510/06* (2013.01)

(56) References Cited

FOREIGN PATENT DOCUMENTS

| | | | |
|---|---|---|---|
| JP | 2005-185910 A | | 7/2005 |
| JP | 2005-230616 A | | 9/2005 |
| JP | 2005-305300 | * | 11/2005 |
| JP | 2005-305300 A | | 11/2005 |
| JP | 2006-043654 | * | 2/2006 |
| JP | 2006-43654 A | | 2/2006 |
| JP | 2006-224086 A | | 8/2006 |
| JP | 2005-185910 | * | 7/2007 |
| JP | 2007-229641 A | | 9/2007 |
| WO | WO 01/36332 A1 | | 5/2001 |
| WO | WO 2005/102523 A1 | | 11/2005 |
| WO | WO 2006/016633 A1 | | 2/2006 |
| WO | WO 2006/025613 A1 | | 3/2006 |

* cited by examiner

EXHAUST GAS PURIFYING CATALYST

TECHNICAL FIELD

The present invention relates to an exhaust gas purifying catalyst and a manufacturing method of the same.

BACKGROUND ART

Recently, automobile exhaust emission regulations have become much stricter. Exhaust gas purifying catalysts have been required to purify harmful components, such as unburned hydrocarbon (HC) and carbon monoxide (CO), included in exhaust gas with high efficiency. The exhaust gas purifying catalyst, in which noble metal particles are supported on a surface of a support such as alumina, oxidizes the harmful components such as unburned hydrocarbon (HC) and carbon monoxide (CO) included in the exhaust gas by the noble metal particles, and converts the components to harmless water or gas (for instance, refer to Japanese Patent Unexamined Publication No. 2005-230616).

On the other hand, due to the recent stricter exhaust emission regulations, the amount of noble metal and the numbers of catalysts to be used have been increasing. Moreover, problems of resource depletion and increase in manufacturing costs have been caused. Therefore, it is necessary to reduce the amount of the noble metal used in the catalysts.

The activation of the noble metal particles is approximately proportional to surface areas of the noble metal particles. Thus, in order to maintain the maximum catalytic activity with the minimum amount of the noble metal, the surface areas of the noble metal particles are required to be large as much as possible. In other words, it is required to keep the noble metal particles fine.

DISCLOSURE OF INVENTION

However, in the conventional art, the noble metal particles may be buried into the support when the catalysts are subjected to the exhaust gas. Therefore, there has been a problem that the catalytic activity is significantly lowered because the contact areas between the exhaust gas and the noble metal particles are decreased even enabling the noble metal particles to be kept in a fine state.

It is an object of the present invention to provide an exhaust gas purifying catalyst possible to maintain high catalytic activity even if the catalyst is subjected to exhaust gas for long periods of time.

In order to achieve the above-mentioned object, an exhaust gas purifying catalyst includes: noble metal particles; and supports, each support supporting the noble metal particles, wherein at least a certain amount of the noble metal particles is provided on an outermost surface of the support, or provided within a range of 10% inside of a diameter of the support from the outermost surface in a direction toward a center of the support.

A manufacturing method of an exhaust gas purifying catalyst according to the present invention, includes: preparing a first liquid including the support supporting noble metal particles on an outermost surface thereof by impregnating a sol of a support having an average diameter of 20 to 30 nm with a noble metal salt.

According to the exhaust gas purifying catalyst of the present invention, at least a certain amount of the noble metal particles is provided on an outermost surface of the support, or provided within a range of 10% inside of a diameter of the support from the outermost surface in a direction toward a center of the support. Therefore, exhaust gas purification performance is significantly improved since contact areas between the exhaust gas and the noble metal particles are increased.

According to the manufacturing method of the exhaust gas purifying catalyst of the present invention, it is possible to efficiently manufacture the catalyst in which at least a certain amount of the noble metal particles is provided on the outermost surface of the support, or provided within a range of 10% inside of a diameter of the support from the outermost surface in a direction toward a center of the support.

BEST MODE FOR CARRYING OUT THE INVENTION

Figure 1:
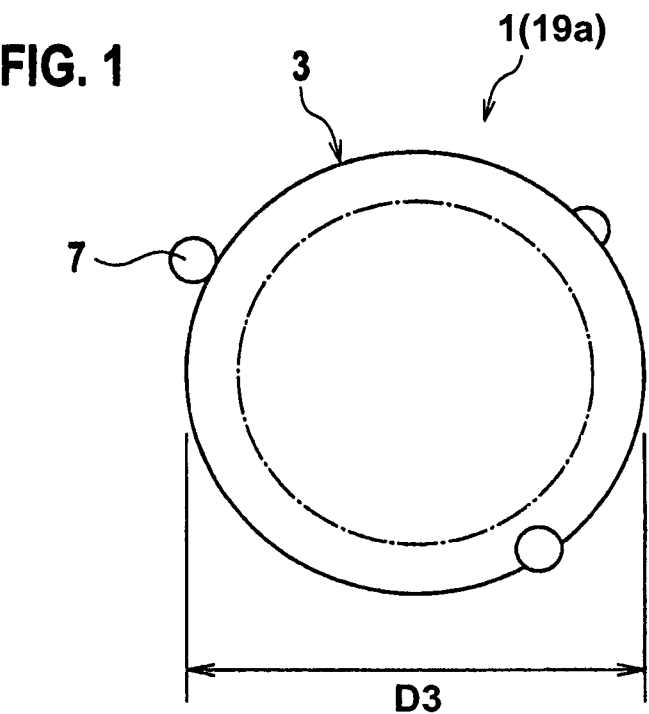
FIG. 1 is a schematic view showing an enlargement of noble metal particles and a support in an exhaust gas purifying catalyst in which the support is composed of a primary particle, according to an embodiment of the present invention.

Hereinafter, a description will be made of an embodiment of the present invention with reference to the drawings.

[Constitution of Catalyst]

An exhaust gas purifying catalyst 1 according to an embodiment of the present invention includes supports 3 and 5 composed of a primary particle or a secondary particle, and noble metal particles 7 supported on the supports 3 and 5.

[Noble Metal Particles]

The noble metal particles 7 are preferably composed of, but not limited to, at least any one of platinum (Pt), palladium (Pd), and rhodium (Rh). Especially as described later, platinum is preferable.

[Support]

Preferably, the supports 3 and 5 are composed of an oxide including cerium (Ce). For instance, $CeO_2$, or composite oxide composed of cerium (Ce) and zirconium (Zr) is preferable. As for the composite oxide composed of cerium (Ce) and zirconium (Zr), $CeZrO_x$ is, for instance, preferable. The reason for using oxide including cerium (Ce) as a support is that cerium composite has oxygen storage capacity (OSC), and is easily connected to the noble metal particles 7, especially platinum particles.

Each of the primary particle 3 and secondary particle 5 can be applied for the support, respectively.

FIG. 1 shows a state where the noble metal particles 7 are supported on the outermost surface of the support composed of the primary particle 3. Preferably, an average particle diameter D3 of the primary particle 3 is 150 nm or less, more preferably, 20 to 30 nm.

The noble metal particles 7 are provided on the outermost surface of the support composed of the primary particle 3, or provided within a range from the outermost surface to 10% inside of the particle diameter of the support in a direction toward a center of the support. Note that, the noble metal particles 7 contacting with the exhaust gas preferably have large surface areas as much as possible in the present embodiment. Therefore, most preferably, the noble metal particles 7 are provided on the outermost surface of the support. There can be little problem of contact between the noble metal particles 7 and the exhaust gas if the noble metal particles 7 are provided on the outermost surface or within the range of 10% (or 5%) inside from the outermost surface of the support. The support can be composed of either the primary particle 3 or the secondary particle 5.

Figure 2:
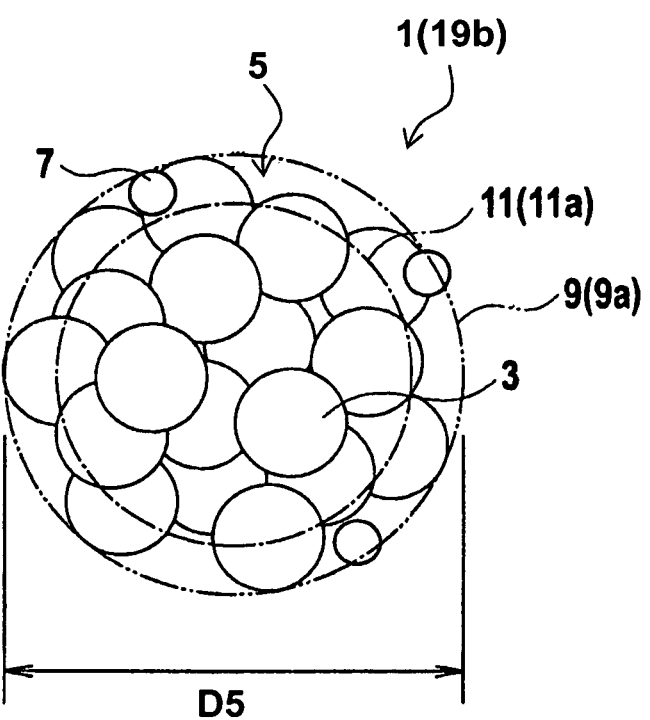
FIG. 2 is a schematic view showing an enlargement of noble metal particles and a support in an exhaust gas purifying catalyst in which the support is composed of a secondary particle, according to an embodiment of the present invention.

FIG. 2 is a schematic view in the case where the support is composed of the secondary particle 5, which is a primary particle aggregation. The support is composed of the secondary particle 5 provided by putting a plurality of the primary particles 3 together. Then, a hypothetical sphere 9 having the smallest diameter while including the entire secondary particle 5 is presumed. A spherical shell 9a of the hypothetical sphere 9 comes in point contact with the surfaces of the plurality of the primary particles 3. The noble metal particles 7 are provided between the spherical shell 9a (indicated by two-dot chain line) of the hypothetical sphere 9 and a spherical shell 11a of another hypothetical sphere 11 (indicated by chain line) of which a diameter is 10% smaller than that of the spherical shell 9a. Note that, each center of the hypothetical spheres 9 and 11 is set to the same position.

For instance, when the hypothetical sphere 9 indicated by the two-dot chain line has a diameter D5 of 30 nm, a diameter of the other hypothetical sphere 11 indicated by the chain line is: 30−3=27 (nm).

When the diameter of the hypothetical sphere 11 is 5% smaller with respect to the hypothetical sphere 9, the diameter of the hypothetical sphere 11 is: 30−1.5=28.5 (nm).

Figure 3:
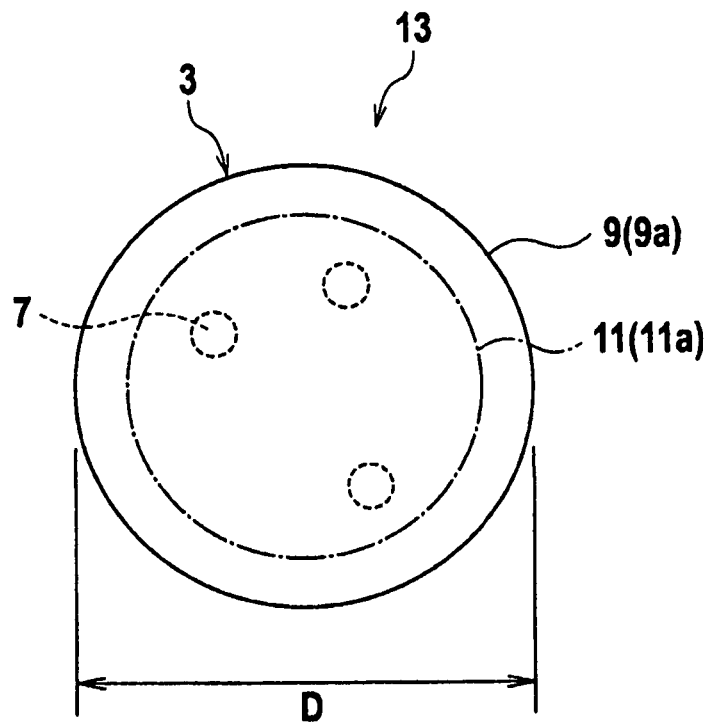
FIG. 3 is a schematic view showing an enlargement of noble metal particles and a support in an exhaust gas purifying catalyst according to Comparative Example.

FIG. 3 is a schematic view showing a layout of the noble metal particles 7 according to Comparative Example. The chain line indicates the spherical shell 11a of the hypothetical sphere 11 10% smaller than the diameter of the support composed of the primary particle as described above.

In Comparative Example shown in FIG. 3, the noble metal particles 7 are buried deep into the support composed of the primary particle 3. Specifically, since the noble metal particles 7 are provided in a range of more than 10% inside of the diameter from the outermost surface of the support, it becomes difficult for the noble metal particles 7 to contact with the exhaust gas even if the catalyst 13 is exposed to the exhaust gas. Thus, exhaust gas purification performance is significantly lowered in the catalyst 13 according to Comparative Example.

When the support is composed of the secondary particle 5, and the catalyst 1 is subjected to the exhaust gas, it may cause the secondary particles 5 to be divided into small pieces. Therefore, the support is more preferably composed of the primary particles 3 only.

[Metal Oxide]

Figure 4:
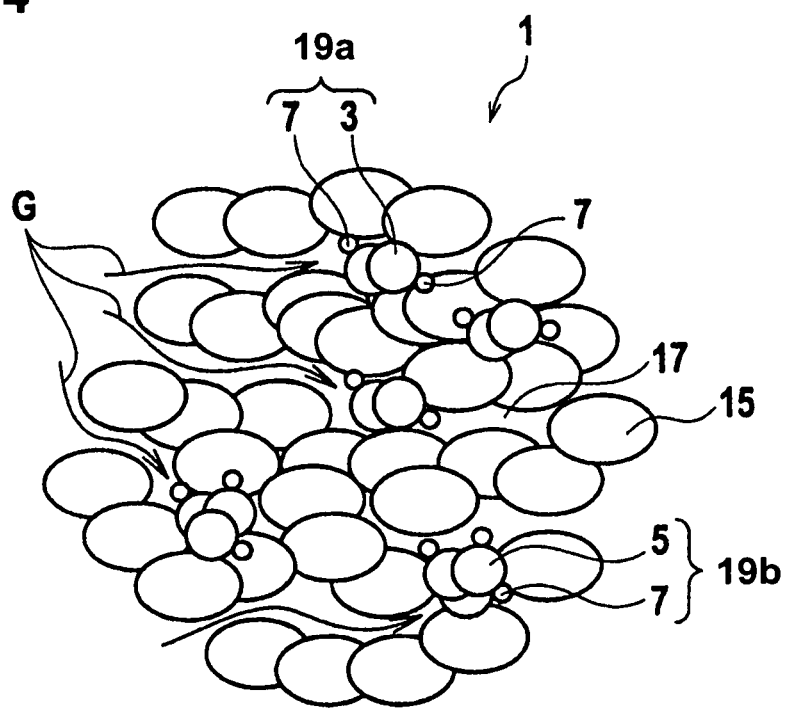
FIG. 4 is a schematic view showing noble metal particles and supports provided in metal oxide according to an embodiment of the present invention.
Figure 5:
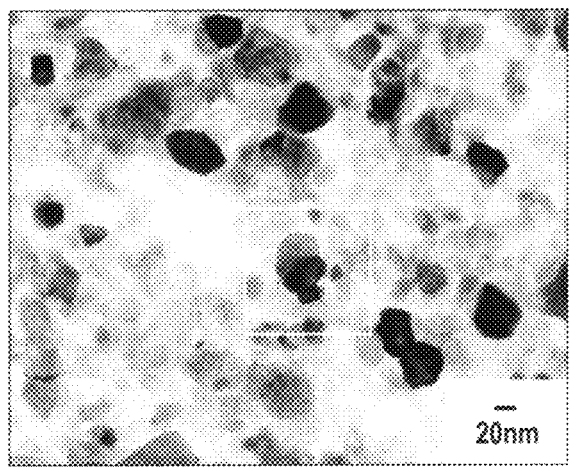
FIG. 5 is a micrograph of TEM showing a catalyst obtained in Example 1.
Figure 6:
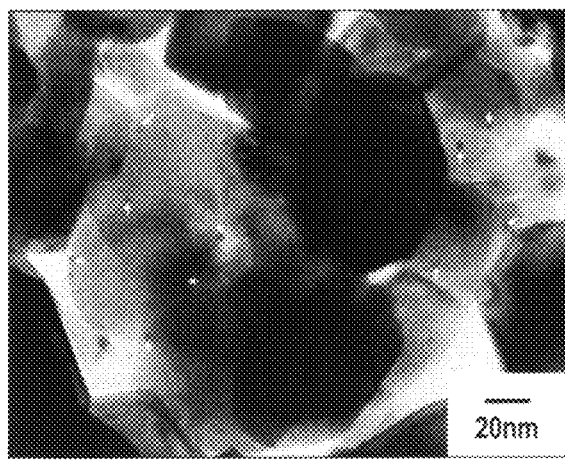
FIG. 6 is a micrograph of TEM showing a catalyst obtained in Example 2.
Figure 7:
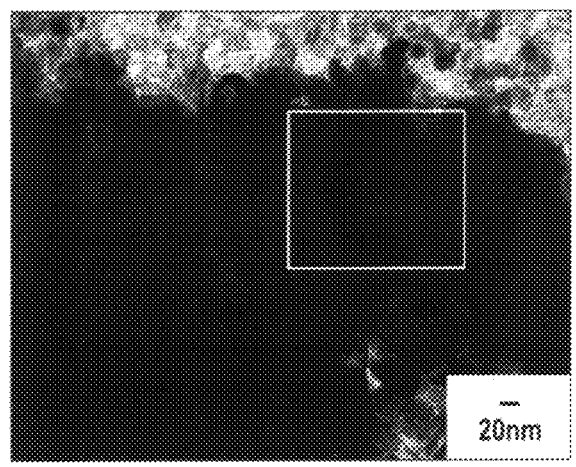
FIG. 7 is a micrograph of TEM showing a catalyst obtained in Comparative Example 1.
Figure 8:
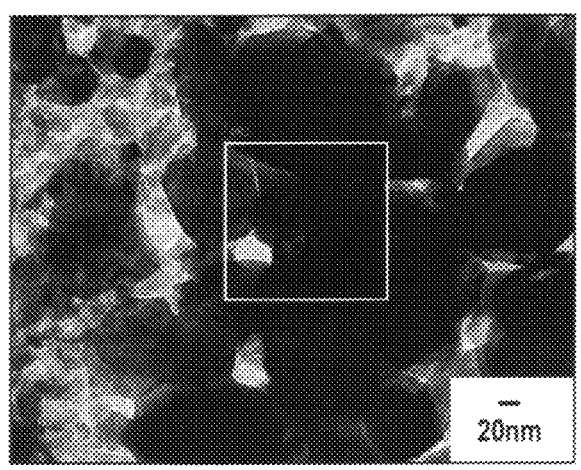
FIG. 8 is a micrograph of TEM showing a catalyst obtained in Comparative Example 3.

Next, a description will be made of a situation where the supports supporting the noble metal particles are provided in metal oxide with reference to FIG. 4.

Metal oxide 15 is an oxide including at least aluminum (Al), for instance, the oxide is preferably $Al_2O_3$. FIG. 4 shows a plurality of $Al_2O_3$ particles as the metal oxide 15. In addition, FIG. 4 shows the noble metal particles 7 composed of platinum (Pt), and the supports composed of the primary particle 3 and the secondary particle 5 of $CeO_2$.

The $Al_2O_3$ particles as the metal oxide 15 are put together so as to provide fine pores 17. When the noble metal particles 7 and the supports 5 supporting the noble metal particles 7 compose a plurality of units 19b, each unit 19b is provided in the fine pores 17 of the metal oxides 15. Likewise, when the noble metal particles 7 and the supports 3 supporting the noble metal particles compose a plurality of units, 19a, each unit 19a is provided in the fine pores 17 of the metal oxides 15. As seen in FIG. 4, each unit 19a; 19b comprises a cluster of one or more supports 3 or 5, respectively and the noble metal particles 7. Thus, the units 19a or 19b are provided so as to be mutually isolated by the metal oxides 15, and the exhaust gas contacts with the units 19a or 19b when the exhaust gas indicated by arrows passes through the fine pores 17 of the metal oxides 15. In the units 19a or 19b, since the noble metal particles 7 are supported on the periphery of the support, the noble metal particles 7 sufficiently contact with the exhaust gas so as to have high purification performance. Therefore, due to providing the units 19a or 19b in the fine pores 17 of the metal oxides 15, it is possible to not only prevent from sintering of the noble metal particles 7, but also prevent from aggregation between the supports.

The preferable combination of the noble metal particles 7, the support, and the metal oxide 15 is that of platinum as the noble metal particles 7, $CeO_2$ as the support, and $Al_2O_3$ as the metal oxide 15. Another combination of platinum as the noble metal particles 7, $CeZrO_x$ as the support, and $Al_2O_3$ as the metal oxide 15 may be possible.

A diameter of the units 19a or 19b is preferably formed larger than the fine pores 17 of the metal oxides 15. When an average diameter of the units 19a or 19b is smaller than the fine pores 17 of the metal oxides 15, the units 19a or 19b composed of the noble metal particles 7 and the supports pass through the fine pores 17 of the metal oxides 15. As a result, aggregation between the units 19a or 19b is easily caused.

Specifically, the diameter of the units 19a or 19b is preferably 150 nm or less. When the diameter of the units 19a or 19b is more than 150 nm, the amount of the noble metal particles 7 on the support becomes too much so that aggregation between the noble metal particles 7 is promoted.

More preferably, the diameter of the units 19a or 19b is 20 to 30 nm.

The diameter of the units 19a or 19b is preferably more than 20 nm since an average pore diameter of the fine pores 17 provided in the $Al_2O_3$ particles as the metal oxide 15 is approximately 20 nm. When the diameter of the units 19a or 19b is more than 30 nm, a particle diameter of the noble metal particles 7 is more than 10 nm. It is not preferable since the catalytic activity is significantly lowered when the particle diameter of the noble metal particles 7 is more than 10 nm. Thus, the diameter of the units 19a or 19b is preferably 20 to 30 nm.

[Manufacturing Method of Exhaust Gas Purifying Catalyst]

Hereinafter, a description will be made of a manufacturing method of the exhaust gas purifying catalyst according to the embodiment of the present invention.

First, a method for using raw material organic salt of the metal oxide will be described.

In the first step, noble metal salt is impregnated with a sol of the support with the average diameter of 20 to 30 nm so as to prepare a first liquid including the support supporting the noble metal particles on the outermost surface.

Next, the raw material organic salt of the metal oxide is dispersed into an organic solvent so as to prepare a second liquid. Then, by mixing the first liquid and the second liquid together, the raw material organic salt of the metal oxide is hydrolyzed. Further, the mixed liquid is dried and baked so as to prepare catalyst powder. As for organic salt, aluminum isopropoxide (AlP) and the like can be used. Thus, by a sol-gel processing, it is possible to provide the unit composed of the noble metal particles and the support in the metal oxide.

Furthermore, a slurry is prepared by use of the catalyst powder, and the slurry is coated on a refractory inorganic substrate (honeycomb substrate), followed by drying and baking so that the exhaust gas purifying catalyst according to the present invention is manufactured.

Next, a method for using raw material inorganic salt of the metal oxide will be described.

Raw material inorganic salt of the support is dispersed into an aqueous solution so as to prepare a third liquid. The third liquid is mixed with the first liquid. As for raw material inorganic salt, boehmite and the like can be used. In addition, raw material inorganic salt is lower in cost than raw material organic salt.

Then, the liquid is dried and baked so as to prepare catalyst powder. The other steps are the same as for the method for using the raw material organic salt of the metal oxide, so that the exhaust gas purifying catalyst according to the present invention is manufactured.

EXAMPLES

Hereinafter, a description will be made in more detail of the present invention with Examples.

Example 1

Step 1: Preparation of Pt/CeO$_2$ Unit

First, dinitrodiamine platinum was added to CeO$_2$ sol in which a particle diameter of primary particles was 26 nm, followed by stirring for 1 day. Thus, Pt/CeO$_2$ units, in which noble metal particles composed of platinum were supported on a support composed of CeO$_2$, were prepared.

Step 2: Inclusion Using Inorganic Aluminum Salt

Next, block boehmite was dissolved in a water solvent, followed by stirring for 1 hour. The liquid including CeO$_2$ prepared in the step 1 was added to the liquid including boehmite, followed by stirring for 1 more hour. The mixed liquid was dried under reduced pressure by an evaporator, and then dried in a drying machine at 150° C. for 1 hour. Powder obtained by drying was baked in a furnace at 550° C. for 3 hours in an atmosphere so as to obtain catalyst powder of Pt/CeO$_2$/Al$_2$O$_3$. The catalyst powder of Pt/CeO$_2$/Al$_2$O$_3$ is constituted by the noble metal particles composed of platinum, the support composed of CeO$_2$, and the metal oxide composed of Al$_2$O$_3$.

Step 3: Application to Honeycomb Substrate 180 g of the catalyst powder obtained in the step 2, 20 g of boehmite, 290 g of water, and 10 g of 10% by weight of nitric acid were put into an alumina-made magnetic pot with an alumina ball to be mixed and ground so as to obtain catalyst slurry. The catalyst slurry was coated on a cordierite-made honeycomb substrate. The cordierite-made honeycomb substrate had 400 cells, 6 mils, and a volume of 0.119 L. Next, the redundant slurry was removed by airflow, followed by drying at 120° C. and baking at 400° C. in the atmosphere. Thus, the catalyst honeycomb substrate coated with 200 g of the catalyst powder per liter of the honeycomb substrate was obtained.

Hereinafter, Example 2 to Comparative Example 5 were performed according to Table 1 shown below.

TABLE 1

| | Noble Metal Particles | Concentration of Supported Noble Metal (wt %) | Support | Metal Oxide | Condition of Raw Material | | |
|---|---|---|---|---|---|---|---|
| | | | | | Primary Particle Diameter of Support (nm) | Secondary Particle Diameter of Support (nm) | Average Fine Pore Diameter of Metal Oxide |
| EXAMPLE 1 | Pt | 0.3 | CeO$_2$ | Al$_2$O$_3$ | 26 | — | 20.6 |
| EXAMPLE 2 | Pt | 0.3 | CeO$_2$ | Al$_2$O$_3$ | 2 | 26 | 20.6 |
| EXAMPLE 3 | Pt | 0.3 | Ce—Zr—Ox | Al$_2$O$_3$ | 25 | — | 20.6 |
| EXAMPLE 4 | Pt | 0.3 | Ce—Zr—Ox | Al$_2$O$_3$ | 2 | 24 | 20.6 |
| EXAMPLE 5 | Pt | 0.3 | CeO$_2$ | Al$_2$O$_3$ | 27 | Several μm | 20.6 |
| COMPARATIVE EXAMPLE 1 | Pt | 0.3 | CeO$_2$ | Al$_2$O$_3$ | 2 | — | 20.6 |
| COMPARATIVE EXAMPLE 2 | Pt | 0.3 | Ce—Zr—Ox | Al$_2$O$_3$ | 2 | — | 20.6 |
| COMPARATIVE EXAMPLE 3 | Pt | 0.3 | CeO$_2$ | Al$_2$O$_3$ | 39 | — | 20.6 |
| COMPARATIVE EXAMPLE 4 | Pt | 0.3 | CeO$_2$ | Al$_2$O$_3$ | 27 | Several μm | 20.6 |
| COMPARATIVE EXAMPLE 5 | Pt | 0.3 | CeO$_2$ | Al$_2$O$_3$ | 2 | — | 20.6 |

TABLE 1-continued

|  | Original Average Diameter of Unit (nm) | After Durability Test Noble Metal Particle Diameter after Exhaust Gas Durability Test (nm) | After Durability Test η | Position of Initial Noble Metal Particles from Surface | Measuring Method of Noble Metal Particle Position |
|---|---|---|---|---|---|
| EXAMPLE 1 | 26 | 3.3 | 86.7 | Outermost Surface | 3D-TEM |
| EXAMPLE 2 | 26 | 3.9 | 81.2 | Outermost Surface (Partially within 5% from surface) | 3D-TEM |
| EXAMPLE 3 | 25 | 3.2 | 89.9 | Outermost Surface | 3D-TEM |
| EXAMPLE 4 | 24 | 3.6 | 85.1 | Outermost Surface (Partially within 5% from Surface) | 3D-TEM |
| EXAMPLE 5 | 130 | 7.1 | 79.8 | Outermost Surface (Partially within 10% from surface) | 3D-TEM |
| COMPARATIVE EXAMPLE 1 | 100 | 8.2 | 1.00 | More than 10% from Surface (Partially surface) | 3D-TEM |
| COMPARATIVE EXAMPLE 2 | 100 | 8.7 | 7.28 | More than 10% from Surface (Partially surface) | 3D-TEM |
| COMPARATIVE EXAMPLE 3 | 39 | 10.8 | 52.1 | Outermost Surface (Partially within 10%) | 3D-TEM |
| COMPARATIVE EXAMPLE 4 | 169 | 16.2 | 41.8 | Outermost Surface (Partially within 10%, partially more than 10%) | 3D-TEM |
| COMPARATIVE EXAMPLE 5 | 15 | 8.0 | 2.24 | Outermost Surface (Partially more than 10% from surface) | 3D-TEM |

Example 2

In Example 2, $CeO_2$ sol including $CeO_2$ of secondary particles was used instead of $CeO_2$ sol in Example 1. With regard to the $CeO_2$ particles in the $CeO_2$ sol, a particle diameter of the primary particles was 2 nm, and a particle diameter of the secondary particles was 26 nm. The other conditions were the same as Example 1 so as to obtain a catalyst honeycomb substrate.

Example 3

In Example 3, sol including Ce—Zr—Ox of primary particles was used instead of $CeO_2$ sol in Example 1. A particle diameter of the primary particles of the sol was 25 nm. A molar ratio of $CeO_2$:$ZrO_2$ was 70:30. The other conditions were the same as Example 1 so as to obtain a catalyst honeycomb substrate.

Example 4

In Example 4, Ce—Zr—Ox sol including Ce—Zr—Ox of secondary particles was used instead of $CeO_2$ sol in Example 1. With regard to the Ce—Zr—Ox particles in the Ce—Zr—Ox sol, a particle diameter of the primary particles was 2 nm, and a particle diameter of the secondary particles was 24 nm. A molar ratio of $CeO_2$:$ZrO_2$ was 70:30. The other conditions were the same as Example 1 so as to obtain a catalyst honeycomb substrate.

Example 5

Step 1: Preparation of Pt/$CeO_2$ Unit

First, $CeO_2$ powder composed of secondary particles was prepared. With regard to the $CeO_2$ powder, a particle diameter of the secondary particles was several μm, and a particle diameter of primary particles was 27 μm. Next, dinitrodiamine platinum was impregnated with the $CeO_2$ powder, followed by baking at 400° C. for 1 hour. Water and nitric acid were added to the Pt/$CeO_2$ powder, followed by grinding by a mill so as to be an average particle diameter of 130 nm.

Step 2: Inorganic Aluminum Salt Inclusion

Next, block boehmite was dissolved in a water solvent, followed by stirring for 1 hour. The liquid including $CeO_2$ prepared in the step 1 was added to the liquid including boehmite, followed by stirring for 1 more hour. The mixed liquid was dried under reduced pressure by an evaporator, and then dried in a drying machine at 150° C. for 1 hour. The obtained powder was baked in a furnace at 550° C. for 3 hours in the atmosphere so as to obtain catalyst powder of Pt/$CeO_2$/$Al_2O_3$.

Step 3: Application to Honeycomb Substrate 180 g of the catalyst powder obtained in the step 2, 20 g of boehmitet, 290 g of water, and 10 g of 10% by weight of nitric acid were put into an alumina-made magnetic pot with an alumina ball to be mixed and ground so as to obtain catalyst slurry. The catalyst slurry was coated on a cordierite-made honeycomb substrate. The cordierite-made honeycomb substrate had 400 cells, 6 mils, and a volume of 0.119 L. Next, the redundant slurry was removed by airflow, followed by drying at 120° C. and baking at 400° C. in the atmosphere. Thus, the catalyst honeycomb substrate coated with 200 g of the catalyst powder per liter of the honeycomb substrate was obtained.

Comparative Example 1

In Comparative Example 1, $CeO_2$ sol including $CeO_2$ particles in which a particle diameter of primary particles was 2 nm was used instead of $CeO_2$ sol in Example 1. The other conditions were the same as Example 1 so as to obtain a catalyst honeycomb substrate.

Comparative Example 2

In Comparative Example 2, sol including Ce—Zr—Ox of primary particles was used instead of $CeO_2$ sol in Example 1. A particle diameter of Ce—Zr—Ox of the primary particles was 2 nm. A molar ratio of $CeO_2$:$ZrO_2$ was 70:30. The other conditions were the same as Example 1 so as to obtain a catalyst honeycomb substrate.

Comparative Example 3

In Comparative Example 3, $CeO_2$ sol including $CeO_2$ particles in which a particle diameter of primary particles was 39 nm was used instead of $CeO_2$ sol in Example 1. The other conditions were the same as Example 1 so as to obtain a catalyst honeycomb substrate.

Comparative Example 4

In Comparative Example 4, approximately the same operations as Example 5 were performed so as to obtain a catalyst honeycomb substrate. The average particle diameter of the particles after milling in Example 5 was 130 nm, however, an average particle diameter of the particles after milling in Comparative Example 4 was 169 nm. The other conditions were the same as Example 5 so as to obtain a catalyst honeycomb substrate.

Comparative Example 5

In Comparative Example 5, approximately the same operations as Comparative Example 1 were performed so as to obtain a catalyst honeycomb substrate. However, after platinum was supported on $CeO_2$ sol, the units were dispersed by ultrasonic waves. The other conditions were the same as Comparative Example 1 so as to obtain a catalyst honeycomb substrate.

[Catalyst Performance Evaluation]

The catalysts obtained in Examples 1 to 5 and Comparative Examples 1 to 5 were exposed to the exhaust gas shown in Table 2 to subject to a durability test.

The used engine was a 3.5 L V type engine, and the used fuel was unleaded gasoline. In addition, a catalyst inlet temperature was set at 900° C. to be subjected to the durability test for 30 hours. The results of the durability test were as shown in the above-described Table 1.

TABLE 2

| Reactant Gas Composition | |
| --- | --- |
| Gas Composition | Theoretical Air Fuel Ratio |
| Z Value (-) | 1 |
| A/F (-) | 14.5 |
| NO (ppm) | 1000 |
| CO (%) | 0.6 |
| $H_2$ (%) | 0.2 |
| $O_2$ (%) | 0.6 |
| $CO_2$ (%) | 13.9 |
| HC (ppm C.) | 1665 |
| $H_2O$ (%) | 10 |
| $N_2$ (Balance) | Rest |

SV = 60,000 h − 1

In Comparative Examples 1 and 2, the platinum particles were buried deep into the support composed of the secondary particles since the units were rapidly aggregated when the platinum particles were supported on the support. In Comparative Example 3, aggregation between the noble metal particles was caused after the durability test, and the diameter of the aggregation of the noble metal particles became 10 nm or more since the diameter of the support composed of the primary particles was 30 nm or more. In Comparative Example 4, since the diameter of the support composed of the secondary particles was 150 nm or more, rapid aggregation between the noble metal particles was caused, which resulted in reduction in the catalytic activity. In Comparative Example 5, since the diameter of the support was smaller than the fine pores of the metal oxide, the units passed through the fine pores after the durability test. As a result, aggregation between the units was caused, and the platinum particles were buried into the aggregated plural units.

Consequently, it was verified that the catalysts according to Examples 1 to 5 could keep higher catalytic activity than the catalysts according to Comparative Examples 1 to 5.

INDUSTRIAL APPLICABILITY

The exhaust gas purifying catalyst according to the present invention can be appropriately used for vehicles such as four-wheel vehicles and two-wheel vehicles. Moreover, the exhaust gas purifying catalyst can keep high catalytic performance even being subjected to high temperature for long periods of time.

The invention claimed is:

1. An exhaust gas purifying catalyst, comprising:
noble metal particles;
supports, each support supporting the noble metal particles, and each support being formed of either a primary particle or a secondary particle formed of a plurality of primary particles; and
$Al_2O_3$ particles arranged together to provide a structure having pores,
wherein the noble metal particles are provided within a range of 10% inside of a diameter of the support from an outermost surface in a direction toward a center of the support,
the noble metal particles and one or more of the supports supporting the noble metal particles form a unit, each unit is provided in the pores of the structure, and the units are covered by the $Al_2O_3$ particles, and
an average diameter of the units is larger than an average diameter of the pores of the structure so that the units are mutually isolated and aggregation is prevented.

2. The exhaust gas purifying catalyst according to claim 1, wherein the noble metal particles are provided within a range of 5% inside of the diameter of the support from the outermost surface in the direction toward the center of the support.

3. The exhaust gas purifying catalyst according to claim 1, wherein the support is formed of a primary particle.

4. The exhaust gas purifying catalyst according to claim 1, wherein the noble metal particles comprise at least any one of platinum (Pt), palladium (Pd), and rhodium (Rh).

5. The exhaust gas purifying catalyst according to claim 1, wherein the support comprises an oxide including at least cerium (Ce).

6. The exhaust gas purifying catalyst according to claim 5, wherein the support as the oxide including cerium is $CeO_2$.

7. The exhaust gas purifying catalyst according to claim 5, wherein the support is a composite oxide composed of cerium (Ce) and zirconium (Zr).

8. The exhaust gas purifying catalyst according to claim 6, wherein the noble metal particles are composed of platinum (Pt).

* * * * *